(12) United States Patent
Kini et al.

(10) Patent No.: US 12,258,363 B2
(45) Date of Patent: Mar. 25, 2025

(54) CRYSTALLINE FORM OF L-GLUFOSINATE AMMONIUM SALT AND PROCESS FOR PRODUCTION THEREOF

(71) Applicant: UPL LTD, Mumbai (IN)

(72) Inventors: Prashant Vasant Kini, Mumbai (IN); Chandrasekhar Dayal Mudaliar, Mumbai (IN); Ashishkumar Ravindra Mishra, Mumbai (IN); Santosh Ganpat Shelke, Mumbai (IN)

(73) Assignee: UPL LTD, Mumbai (IN)

( * ) Notice: Subject to any disclaimer, the term of this patent is extended or adjusted under 35 U.S.C. 154(b) by 0 days.

(21) Appl. No.: 17/635,491

(22) PCT Filed: Jul. 30, 2021

(86) PCT No.: PCT/IB2021/056951
§ 371 (c)(1),
(2) Date: Feb. 15, 2022

(87) PCT Pub. No.: WO2022/024052
PCT Pub. Date: Feb. 3, 2022

(65) Prior Publication Data
US 2023/0144309 A1    May 11, 2023

(30) Foreign Application Priority Data
Jul. 31, 2020   (IN) .............................. 202021033002

(51) Int. Cl.
| | | |
|---|---|---|
| *C07F 9/30* | (2006.01) | |
| *A01N 25/12* | (2006.01) | |
| *A01N 57/20* | (2006.01) | |
| *A01P 13/00* | (2006.01) | |

(52) U.S. Cl.
CPC .............. *C07F 9/301* (2013.01); *A01N 25/12* (2013.01); *A01N 57/20* (2013.01); *A01P 13/00* (2021.08); *C07B 2200/13* (2013.01)

(58) Field of Classification Search
CPC .......... C07F 9/301; A01P 13/00; A01N 25/12; A01N 57/20; C07B 2200/13
USPC ......................................................... 504/206
See application file for complete search history.

(56) References Cited

U.S. PATENT DOCUMENTS

| | | |
|---|---|---|
| 4,226,941 A | 10/1980 | Goi et al. |
| 5,869,668 A | 2/1999 | Knorr et al. |
| 7,795,464 B2 | 9/2010 | Minowa et al. |

FOREIGN PATENT DOCUMENTS

| | | |
|---|---|---|
| CN | 105541906 A | 5/2016 |
| CN | 108727427 A | 11/2018 |
| CN | 109651433 A | 4/2019 |
| CN | 111072718 A | 4/2020 |
| WO | 2019018406 A1 | 1/2019 |
| WO | 2020214631 A1 | 10/2020 |

OTHER PUBLICATIONS

International Search Report and Written Opinion for International Application PCT/IB2021/056951; International Filing Date: Jul. 30, 2021; Date of Mailing: Oct. 28, 2021; 17 pages.

*Primary Examiner* — Kristin A Vajda
(74) *Attorney, Agent, or Firm* — CANTOR COLBURN LLP

(57) ABSTRACT

The present disclosure relates to a novel crystalline form of L-glufosinate ammonium salt and a process for preparation thereof. The present disclosure also provides compositions comprising said form and a method for the control of undesired plant growth using said compositions.

9 Claims, 5 Drawing Sheets

DAD: Signal A,
195.0 nm/Bw:4.0
nm Results

| Retention Time | Area | Area % | Height | Height % |
|---|---|---|---|---|
| 2.729 | 1985494 | 0.80 | 246846 | 0.77 |
| 3.347 | 414332 | 0.17 | 64806 | 0.20 |
| 3.987 | 2506681 | 1.02 | 339085 | 1.06 |
| 4.347 | 236683285 | 95.92 | 30740312 | 96.40 |
| 5.093 | 488082 | 0.20 | 59845 | 0.19 |
| 5.507 | 4023777 | 1.63 | 400629 | 1.26 |
| 8.340 | 641912 | 0.26 | 36026 | 0.11 |
| Totals | 246723543 | 100.00 | 31887349 | 100.00 |

CRYSTALLINE FORM OF L-GLUFOSINATE AMMONIUM SALT AND PROCESS FOR PRODUCTION THEREOF

CROSS REFERENCE TO RELATED APPLICATIONS

This application is a National Stage application of PCT/IB2021/056951, filed Jul. 30, 2021, which claims priority to Indian Patent Application No. 202021033002, filed Jul. 31, 2020, both of which are incorporated by reference in their entirety herein.

FIELD OF THE INVENTION

The present invention relates to a novel solid form of L-glufosinate ammonium salt and a process for preparation thereof. The present invention also provides compositions comprising said form and a method for the control of undesired plant growth using said compositions.

BACKGROUND OF THE INVENTION

DL-homoalanin-4-yl(methyl)phosphinic acid (glufosinate) and salts are amino acid derivatives with herbicidal activity. The amino acid derivatives are active in the L-form. Several processes have been developed to prepare L-homoalanin-4-yl(methyl)phosphinic acid (L-glufosinate) and particularly the ammonium salt in order to use the pure active ingredient.

Many synthetic processes end up with an acid addition salt of L-glufosinate from which the corresponding free acid(L-Glufosinate) or the ammonium salt needs to be produced. Salts are preferred commercially due to high solubility in water.

U.S. Pat. No. 4,226,941 discloses the preparation of L-glufosinate or a salt by enzymatic preparation.

U.S. Pat. No. 5,869,668 and CN111072718A disclose the preparation of L-glufosinate or a salt by resolution via precipitation of one of the diastereomeric salt using a chiral base followed by the isolation process.

U.S. Pat. No. 7,795,464 discloses the preparation of L-glufosinate by an asymmetric synthesis reaction.

CN105541906A discloses a two-step process for the preparation of L-glufosinate ammonium salt starting from L-glufosinate hydrochloride salt using an aqueous alcohol solvent system and ammonia.

In most cases, the addition salt of L-glufosinate is obtained at the end of reaction, which needs to be converted to ammonium salt or alkali metal salt of L-glufosinate. This can be done in two ways, either by converting the acid addition salt to the free acid followed by conversion to the desired salt; or by converting the acid addition salt to the desired salt.

By following any of the method as described above, the isolation process will require post treatment process involving complex procedures using ion exchange column or treatment of acid addition salt of L-glufosinate with hazardous chemicals such as ethylene oxide and propylene oxide. The preparation and purification of L-glufosinate ammonium salt often requires multistep process which includes hydrolysis and crystallisation procedures affecting the yield and purity of the product.

Therefore, there is a need for novel solid form of L-glufosinate ammonium salt and to develop a production method for preparing high purity L-glufosinate ammonium salt that is free of acid addition salt of L-glufosinate and/or L-glufosinate starting from acid addition salt of L-glufosinate.

It is surprisingly found by the present inventors that L-glufosinate ammonium salt having high purity and high yield can be prepared in a single step from acid addition salt of L-glufosinate. The present disclosure also provides a crystalline form of L-glufosinate ammonium salt advantageous for production and use in formulation products.

OBJECT OF THE INVENTION

It is an object to provide a novel solid form of L-glufosinate ammonium salt.

It is another object to provide a simple and convenient production of L-glufosinate ammonium salt.

It is another object to provides a single step process for producing ammonium salt of L-glufosinate.

Yet another object is to provide a production method for L-glufosinate ammonium salt that is substantially free from acid addition salt of L-glufosinate and/or L-glufosinate and any other reaction by-products.

It is another object to provide L-glufosinate ammonium salt in high purity and yield.

SUMMARY OF THE INVENTION

In an aspect the present disclosure provides a novel solid form of L-glufosinate ammonium salt.

In another aspect the present disclosure provides a crystalline form of L-glufosinate ammonium salt, substantially free from acid addition salt of L-glufosinate and/or L-glufosinate and any other reaction by-products.

In another aspect the present disclosure provides a process for preparing a compound expressed by the following Formula (I)

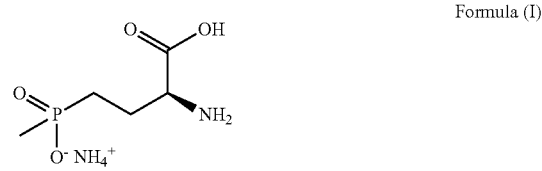

Formula (I)

said process comprising:
a) suspending an acid addition salt compound expressed by the following Formula (II), wherein A⁻ is an anion, in a solvent to form a suspension;

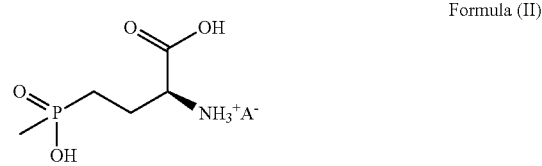

Formula (II)

b) contacting the suspension with gaseous ammonia until complete dissolution of compound expressed by Formula (II) to form a solution; and
c) precipitating the compound expressed by Formula (I)

In another aspect the present disclosure provides a process for producing a compound expressed by Formula (I) said process comprising:

a) suspending an acid addition salt compound expressed by Formula (II) in an alcohol solvent, in a ratio of compound expressed by Formula (II) to alcohol, from about 1:5 to about 1:15 by weight to form a suspension;

b) contacting the suspension with gaseous ammonia in nonaqueous conditions until complete dissolution of compound expressed by Formula (II) to form a solution; and c) subjecting the solution to conditions sufficient to precipitate the compound expressed by Formula (I).

In another aspect the present disclosure provides L-glufosinate ammonium salt having a volume average particle size distribution D50 less than or equal to about 250 microns, specifically about 1 micron to about 200 microns, and most specifically about 10 microns to about 175 microns.

The present disclosure also provides the uses of crystalline form I of L-glufosinate ammonium salt for preparing other forms of L-glufosinate or other salts thereof.

The present disclosure also encompasses the use of crystalline form I of L-glufosinate ammonium salt of the present disclosure for the preparation of agrochemical compositions and/or formulations.

In another aspect, the present disclosure provides agrochemical compositions comprising crystalline form I of L-glufosinate ammonium salt according to the present disclosure.

In yet another embodiment, the present disclosure agrochemical formulations comprising crystalline form I of L-glufosinate ammonium salt and at least one agrochemically acceptable additive/excipient.

The present disclosure comprises processes for preparing the above mentioned agrochemical formulations of L-glufosinate ammonium salt comprising crystalline form I of L-glufosinate ammonium salt and at least one agrochemically acceptable additive/excipient.

In another aspect the present disclosure provides a method for the control of undesired plant growth, comprising subjecting the plants or their locus to the action of a crystalline form I of L-glufosinate ammonium salt.

DETAILED DESCRIPTION OF THE INVENTION

In any aspect or embodiment described hereinbelow, the phrase comprising may be replaced by the phrases "consisting of" or "consisting essentially of" or "consisting substantially of". Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively. As used herein in this context, the expression "substantially free" will be understood to mean that the crystalline form contains 20% or less, 10% or less, 5% or less, 2% or less, or 1% or less of any other form or salt of the subject compound as measured, for example, by PXRD. As used herein, the term "about" refers to a measurable value such as a parameter, an amount, a temporal duration, and the like and is meant to include variations of +/−15% or less, specifically variations of +/−10% or less, more specifically variations of +/−5% or less, even more specifically variations of +/−1% or less, and still more specifically variations of +/−0.1% or less of and from the particularly recited value, in so far as such variations are appropriate to perform in the disclosure described herein. Furthermore, it is also to be understood that the value to which the modifier "about" refers is itself specifically disclosed herein.

In an aspect the present disclosure provides a novel solid form of L-glufosinate ammonium salt.

With respect to the present disclosure L-glufosinate ammonium salt is a crystalline form of L-glufosinate ammonium salt referred herein as Form I. "L-glufosinate ammonium salt", "L-glufosinate ammonium" and crystalline form of L-glufosinate ammonium salt interchangeably used throughout the specification refers to crystalline Form I.

Accordingly, the present disclosure provides a crystalline form I of L-glufosinate ammonium salt.

The present disclosure provides crystalline form I of L-glufosinate ammonium salt which at least 80% by weight, in particular at least 90% by weight, consists of form I of L-glufosinate ammonium salt.

The crystalline form I of L-glufosinate ammonium salt can be identified by X-ray powder diffractometry on the basis of its diffractogram.

Figure 1:
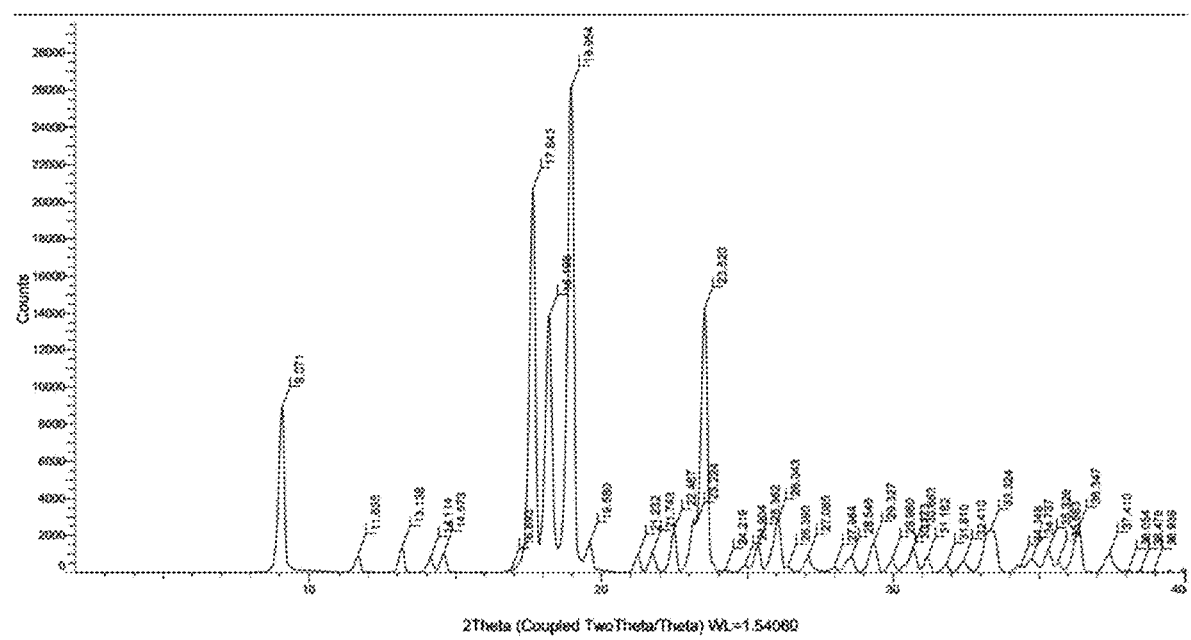
FIG. 1: X-ray powder diffractogram recorded using Cu—Kα radiation for crystalline form I of L-glufosinate ammonium salt.

Typically, the crystalline form of L-glufosinate ammonium salt is characterized by X-ray powder diffractogram pattern substantially as depicted in FIG. 1.

In an embodiment the present disclosure provides a crystalline form I of L-glufosinate ammonium salt which in an X-ray powder diffractogram using Cu—Kα radiation displays at least three of the following reflections, quoted as 2θ(±0.2°) values of about 9.0, 11.6, 13.1, 14.1, 17.6, 18.2, 18.9, 19.5, 22.4, 23.4, 26.0, 31.1, 33.3 and 36.3.

In an embodiment the present invention provides a crystalline form I of L-glufosinate ammonium salt which in an X-ray powder diffractogram using Cu—Kα radiation displays at least a reflection, quoted as 2θ(±0.2°) value of about 9.0, 13.1, 14.1 and 18.9.

In an embodiment the present invention provides a crystalline form I of L-glufosinate ammonium salt which in an X-ray powder diffractogram using Cu—Kα radiation displays at least one peak selected from the group 17.6, 18.2, 18.9 and 23.4 degree 2θ±0.2 degree 2θ.

In an embodiment the present disclosure provides a crystalline form I of L-glufosinate ammonium salt which in an X-ray powder diffractogram using Cu—Kα radiation displays at least one of the values quoted as 2θ(±0.2°) selected from 17.6, 18.2, 18.9 and 23.4 degree 2θ±0.2 degree 2θ having at least 30% relative intensity compared to the highest intensity peak at 18.9.

In an embodiment the present disclosure provides a crystalline form I of L-glufosinate ammonium salt which in an X-ray powder diffractogram using Cu—Kα radiation displays at least one of the values quoted as 2θ(±0.2°) selected from 17.6, 18.2, 18.9 and 23.4 having at least 30% relative intensity compared to the highest intensity peak at 18.9.

In another embodiment the present disclosure provides a crystalline form I of L-glufosinate ammonium salt which in an X-ray powder diffractogram using Cu—Kα radiation displays at least one of the values quoted as 2θ(±0.2°) s selected from 17.6, 18.2, 18.9 and 23.4 having at least 50% relative intensity compared to the highest intensity peak at 18.9.

In an embodiment a crystalline form I of L-glufosinate ammonium salt which in an X-ray powder diffractogram using Cu—Kα radiation displays at least one of the values quoted as 2θ(±0.2°)s selected from 17.6, 18.2, 18.9 and 23.4 having % intensity of the peak as follows:

| Peak Value (2θ (±0.2°)) | Intensity (%) |
|---|---|
| 17.6 | 88.3 |
| 18.2 | 80.6 |
| 18.9 | 100.0 |
| 23.5 | 54.3 |

In another embodiment a crystalline form I of L-glufosinate ammonium salt which in an X-ray powder diffractogram using Cu—Kα radiation displays at least one of the values quoted as 2θ(±0.2°)s selected from 17.6, 18.2, 18.9 and 23.4 having % intensity of the peak as follows:

| Peak Value (2θ (±0.2°)) | Intensity (%) |
|---|---|
| 17.5 | 79.8 |
| 18.1 | 49.3 |
| 18.9 | 100.0 |
| 23.4 | 53.2 |

In another embodiment a crystalline form I of L-glufosinate ammonium salt which in an X-ray powder diffractogram using Cu—Kα radiation displays at least one of the values quoted as 2θ(±0.2°)s selected from 17.6, 18.2, 18.9 and 23.4 having % intensity of the peak as follows:

| Peak Value (2θ (±0.2°)) | Intensity (%) |
|---|---|
| 17.6 | 79.1 |
| 18.2 | 53.0 |
| 19.0 | 100.0 |
| 23.5 | 54.6 |

In another embodiment a crystalline form I of L-glufosinate ammonium salt which in an X-ray powder diffractogram using Cu—Kα radiation displays at least one of the values quoted as 2θ(±0.2°)s selected from 17.6, 18.2, 18.9 and 23.4 having % intensity of the peak as follows:

| Peak Value (2θ (±0.2°)) | Intensity (%) |
|---|---|
| 17.6 | 82.3 |
| 18.2 | 55.6 |
| 19.0 | 100.0 |
| 23.5 | 59.3 |

In another embodiment a crystalline form I of L-glufosinate ammonium salt which in an X-ray powder diffractogram using Cu—Kα radiation displays at least one of the values quoted as 2θ(±0.2°)s selected from 17.6, 18.2, 18.9 and 23.4 having % intensity of the peak as follows:

| Peak Value (2θ (±0.2°)) | Intensity (%) |
|---|---|
| 17.6 | 88.5 |
| 18.2 | 61.6 |
| 18.9 | 100.0 |
| 23.5 | 61.8 |

In an embodiment the present disclosure provides crystalline form I of L-glufosinate ammonium salt which in an X-ray powder diffractogram using Cu—Kα radiation displays at least six of the following reflections, quoted as 2θ(±0.2°) values of about 9.0, 11.6, 13.1, 14.1, 17.6, 18.2, 18.9, 19.5, 22.4, 23.4, 26.0, 31.1, 33.3 and 36.3.

Figure 2:
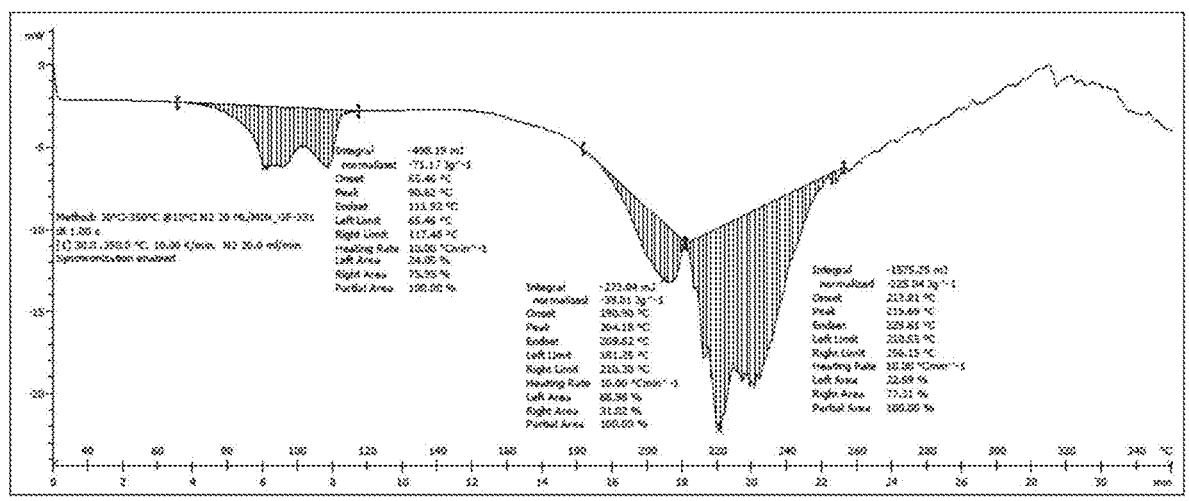
FIG. 2: Differential Scanning Calorimetry thermogram for crystalline form I of L-glufosinate ammonium salt.

In an embodiment the present disclosure provides a crystalline form of L-glufosinate ammonium salt characterized by one or more data selected from
an X-ray powder diffractogram pattern having peaks at 9.0, 11.6, 13.1, 14.1, 17.6, 18.2, 18.9, 19.5, 22.4, 23.4, 26.0, 31.1, 33.3 and 36.3 degree 2θ±0.2 degree 2θ;
an X-ray powder diffractogram pattern having at least three peaks selected from the group 9.0, 11.6, 13.1, 14.1, 17.6, 18.2, 18.9, 19.5, 22.4, 23.4, 26.0, 31.1, 33.3 and 36.3 degree 2θ±0.2 degree 2θ;
an X-ray powder diffractogram pattern substantially as depicted in FIG. 1;
a differential Scanning Calorimetry thermogram having at least two characteristic thermal events in the range of 65-115° C., 185-210° C. and 210-235° C.;
a differential Scanning Calorimetry thermogram substantially as depicted in FIG. 2;
and combinations thereof.

In an aspect the present disclosure provides crystalline form I of L-glufosinate ammonium salt which is further characterised by the w/w ratio of L-glufosinate to ammonium.

According to an embodiment, the present invention provides a crystalline form of L-glufosinate ammonium wherein the ratio of L-glufosinate and ammonium is in the range of 9.5-11:1.

Crystalline form I of L-glufosinate ammonium salt is further characterised by the ratio of L-glufosinate to ammonium that is equivalent to the theoretical ratio of 10.06:1.

In an embodiment the present disclosure provides crystalline form I of L-glufosinate ammonium salt which contains L-glufosinate and ammonium in a w/w ratio in the range of 9.5-11:1.

In an embodiment the present disclosure provides crystalline form I of L-glufosinate ammonium salt which contains L-glufosinate and ammonium in a w/w ratio in the range of 9.9-10.5:1.

In an embodiment the present disclosure provides crystalline form I of L-glufosinate ammonium salt which in an X-ray powder diffractogram using Cu—Kα radiation displays at least three of the following reflections, quoted as 2θ(±0.2°) values of about 9.0, 11.6, 13.1, 14.1, 17.6, 18.2, 18.9, 19.5, 22.4, 23.4, 26.0, 31.1, 33.3 and 36.3 and containing L-glufosinate and ammonium in a w/w ratio in the range of 9.5-11:1.

In an embodiment the present disclosure provides a crystalline form I of L-glufosinate ammonium salt which in an X-ray powder diffractogram using Cu—Kα radiation displays at least one of the values quoted as 2θ(±0.2°)s selected from 17.6, 18.2, 18.9 and 23.4 having at least 50% relative intensity compared to the highest intensity peak and containing L-glufosinate and ammonium in a w/w ratio in the range of 9.5-11:1.

In an embodiment the present disclosure provides a crystalline form I of L-glufosinate ammonium salt which in an X-ray powder diffractogram using Cu—Kα radiation displays at least one of the values quoted as 2θ(±0.2°) of about 11.6, 17.6, 18.2, 23.4, 26.0 and 33.3 and containing L-glufosinate and ammonium in a w/w ratio in the range of 9.5-11:1.

In an embodiment the present disclosure provides a crystalline form I of L-glufosinate ammonium salt which displays a Differential Scanning Calorimetry (DSC) thermogram with at least two characteristic thermal events in the range of 65-115° C., 185-210° C. and 210-235° C.

In an embodiment characteristic thermal events were recorded as endotherm.

In an embodiment the present invention provides a crystalline form I of L-glufosinate ammonium salt which displays a Differential Scanning Calorimetry (DSC) thermogram having at least two characteristic endotherm in the range of 65-115° C., 185-210° C. and 210-235° C.

In an embodiment the present disclosure provides crystalline form I of L-glufosinate ammonium salt which displays a DSC thermogram with reference to FIG. 2.

With respect to the present disclosure compound expressed by Formula (I) refers to L-glufosinate ammonium, L-glufosinate ammonium salt or crystalline form I of L-glufosinate ammonium salt.

With respect to the present disclosure compound expressed by Formula (II) refers to an acid addition salt of L-glufosinate, the salt being formed with an acid selected from an inorganic acid or an organic acid, for example hydrochloric acid, sulfuric acid, phosphoric acid, acetic acid etc.

In an embodiment the present disclosure provides crystalline form I of L-glufosinate ammonium salt characterised by data selected from at least one of the following:
  an X-ray powder diffractogram using Cu—Kα radiation displays at least three of the following reflections, quoted as 2θ(±0.2°) values of about 9.0, 11.6, 13.1, 14.1, 17.6, 18.2, 18.9, 19.5, 22.4, 23.4, 26.0, 31.1, 33.3 and 36.3 and
  a Differential Scanning Calorimetry (DSC) thermogram with at least two characteristic thermal events in the range of 65-115° C., 185-210° C. and 210-235° C.

In an embodiment the present disclosure provides crystalline form I of L-glufosinate ammonium salt characterised by at least one property selected from
  an X-ray powder diffractogram using Cu—Kα radiation displays at least three of the following reflections, quoted as 2θ(±0.2°) values of about 9.0, 11.6, 13.1, 14.1, 17.6, 18.2, 18.9, 19.5, 22.4, 23.4, 26.0, 31.1, 33.3 and 36.3 and containing L-glufosinate and ammonium in a ratio in the range of 9.5-11:1 or
  a Differential Scanning Calorimetry (DSC) thermogram with at least two characteristic thermal events in the range of 65-115° C., 185-210° C. and 210-235° C.

In an embodiment the present disclosure provides a crystalline form I of L-glufosinate ammonium salt which in an X-ray powder diffractogram using Cu—Kα radiation displays at least one of the values quoted as 2θ(±0.2°)s selected from 17.6, 18.2, 18.9 and 23.4 having % intensity of the peak at least 50 and containing L-glufosinate and ammonium in a w/w ratio in the range of 9.5-11:1 and exhibiting a Differential Scanning Calorimetry (DSC) thermogram with at least two characteristic thermal events in the range of 65-115° C., 185-210° C. and 210-235° C.

In an embodiment the present disclosure provides a crystalline form I of L-glufosinate ammonium salt which in an X-ray powder diffractogram using Cu—Kα radiation displays at least one of the values quoted as 2θ(±0.2°) of about 11.6, 17.6, 18.2, 23.4, 26.0 and 33.3 and containing L-glufosinate and ammonium in a w/w ratio in the range of 9.5-11:1 and exhibiting a Differential Scanning Calorimetry (DSC) thermogram with at least two characteristic thermal events in the range of 65-115° C., 185-210° C. and 210-235° C.

In another aspect the present disclosure provides a single step conversion of an acid addition salt of L-glufosinate to ammonium salt of L-glufosinate in high yield and purity.

In an aspect the present disclosure provides a process for the preparation of solid-form of L-glufosinate ammonium salt.

In an embodiment the present disclosure provides a process for preparing crystalline form of L-glufosinate ammonium salt.

The present process can produce the solid from of L-glufosinate ammonium salt in substantially pure form.

The term "substantially pure solid form of L-glufosinate ammonium salt" refers to the solid form having a purity of greater than about 95 wt %, specifically greater than about 98 wt %. The substantially pure form of L-glufosinate ammonium salt is substantially free from acid addition salt of L-glufosinate and/or L-glufosinate and any other reaction by-products.

Typically, the purity can be measured by High Performance Liquid Chromatography (HPLC).

In another aspect the present disclosure provides substantially pure crystalline form of L-glufosinate ammonium salt.

In an embodiment the present disclosure provides a process for producing a compound expressed by the following Formula (I)

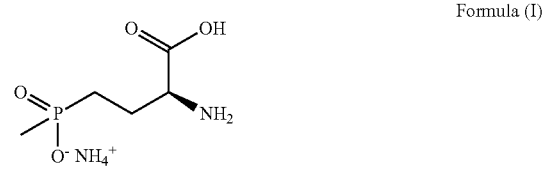

Formula (I)

said process comprising:
a) suspending an acid addition salt compound expressed by the following Formula (II), wherein A⁻ is an anion, in an alcohol solvent to form a suspension;

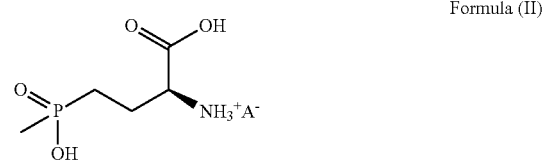

Formula (II)

b) contacting the suspension with gaseous ammonia until complete dissolution of compound expressed by Formula (II) to form a solution; and
c) subjecting the solution to conditions sufficient to precipitate the compound expressed by Formula (I).

The process according to the present disclosure is schematically represented as follows:

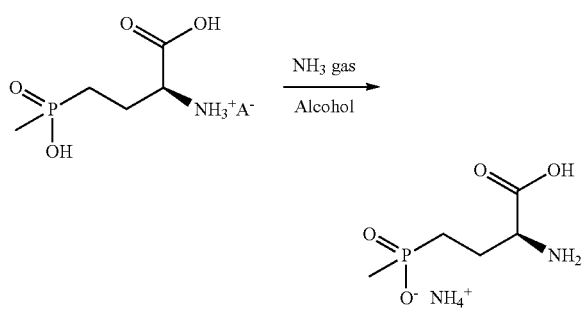

wherein A⁻ is an anion.

In an embodiment the anion A⁻ is selected from halides, phosphates, sulphates or acetates.

In an embodiment the acid addition salt of compound expressed by the following Formula (II) is being formed with L-glufosinate and an acid selected from hydrochloric acid, sulfuric acid, phosphoric acid and acetic acid.

In an embodiment the acid addition salt of L-glufosinate is L-glufosinate hydrochloride salt.

L-glufosinate hydrochloride salt can be prepared by processes known in the art.

In an embodiment the present disclosure provides a process for producing L-glufosinate ammonium salt said process comprising:
- a) suspending L-glufosinate hydrochloride salt in an alcohol solvent to form a suspension;
- b) contacting the suspension with gaseous ammonia in nonaqueous conditions until complete dissolution of L-glufosinate hydrochloride salt to form a solution; and
- c) subjecting the solution to conditions sufficient to precipitate L-glufosinate ammonium salt.

In an embodiment the process for producing L-glufosinate ammonium salt comprising:
- a) contacting a suspension comprising L-glufosinate hydrochloride salt in an alcohol solvent with gaseous ammonia in nonaqueous conditions to form a solution and
- b) subjecting the solution to conditions sufficient to obtain L-glufosinate ammonium salt.

The present disclosure further provides a process for producing a compound expressed by Formula (I) said process comprising:
- a) suspending an acid addition salt compound expressed by Formula (II) in an alcohol solvent, in a ratio of compound expressed by Formula (II) to alcohol, from about 1:5 to about 1:15 by weight, to form a suspension;
- b) contacting the suspension with gaseous ammonia in nonaqueous conditions until complete dissolution of compound expressed by Formula (II) to form a solution; and
- c) subjecting the solution to conditions sufficient to precipitate the compound expressed by Formula (I).

In an embodiment the present disclosure provides a process for producing L-glufosinate ammonium salt said process comprising:
- a) suspending L-glufosinate hydrochloride salt in an alcohol solvent, in a ratio of L-glufosinate hydrochloride salt to alcohol, from about 1:5 to about 1:10 by weight, to form a suspension;
- b) contacting the suspension with gaseous ammonia in nonaqueous conditions until complete dissolution of L-glufosinate hydrochloride salt to form a solution; and
- c) subjecting the solution to conditions sufficient to precipitate L-glufosinate ammonium salt.

In an embodiment the process is carried out in nonaqueous conditions.

In an embodiment the alcohol solvent is selected from but not limited to methanol, ethanol, propyl alcohol, isopropyl alcohol, glycol, glycerol or mixtures thereof.

In an embodiment the alcohol solvent is methanol.

In an embodiment the ratio of acid addition salt compound expressed by Formula (II) to alcohol, is from about 1:5 to about 1:10 by weight.

In an embodiment the ratio of acid addition salt compound expressed by Formula (II) to alcohol, is from about 1:5 to about 1:8 by weight.

In an embodiment the ratio of L-glufosinate hydrochloride salt to alcohol, from about 1:5 to about 1:8 by weight.

In an embodiment the alcohol solvent is selected from mixture of an alcohol solvent with ketonic solvent such as acetone.

In an embodiment step b) is performed by contacting step a) suspension with gaseous ammonia until complete dissolution of L-glufosinate hydrochloride.

In an embodiment step b) is performed by purging gaseous ammonia.

In an embodiment the ratio of acid addition salt compound expressed by Formula (II) to gaseous ammonia is from about 1:1 to about 1:5.

In an embodiment the ratio of acid addition salt compound expressed by Formula (II) to gaseous ammonia is from about 1:2 to about 1:5.

In an embodiment the mole ratio of L-glufosinate hydrochloride salt to gaseous ammonia is from about 1:2 to about 1:5.

In an embodiment step b) provides a solution, wherein the solution has a pH of 7 to 12.

In an embodiment step b) provides a solution, wherein the solution has a pH of 7.5 to 10.

In an embodiment step c) is performed at a temperature between 30°–90° C. to allow L-glufosinate ammonium salt to precipitate out.

In an embodiment step c) is performed at a temperature between 40°–80° C. to allow L-glufosinate ammonium salt to precipitate out.

In an embodiment L-glufosinate ammonium salt is filtered out.

In an embodiment, the impurities and side products from the previous steps and ammonium chloride formed in the reaction remained in the filtrate.

In an embodiment the chemical purity of L-glufosinate ammonium salt is at least 95% by weight.

In an embodiment the chemical purity of L-glufosinate ammonium salt is more than 96% by weight.

In an embodiment the chiral purity of L-glufosinate ammonium salt is absolute.

In an embodiment the L:D ratio of L-glufosinate ammonium salt is from about 95:5 to about 99.9:0.1.

In an embodiment the L:D ratio of L-glufosinate ammonium salt is from about 96:4 to about 99:1.

The present disclosure further provides L-glufosinate ammonium salt that is substantially free from acid addition salt of L-glufosinate and/or L-glufosinate.

In an embodiment the present disclosure provides L-glufosinate ammonium salt that is substantially free from acid addition salt of L-glufosinate.

In an embodiment the present disclosure provides L-glufosinate ammonium salt that is substantially free from L-glufosinate hydrochloride salt.

In an embodiment the present disclosure provides L-glufosinate ammonium salt that contains less than 0.5% by weight of L-glufosinate hydrochloride salt.

In an embodiment the present disclosure provides L-glufosinate ammonium salt that is substantially free from L-glufosinate.

In an embodiment the present disclosure provides L-glufosinate ammonium salt that contains less than 0.5% by weight of L-glufosinate.

L-glufosinate ammonium salt prepared according to the present disclosure is having a volume average particle size distribution D50 less than or equal to about 250 microns, specifically about 1 micron to about 200 microns, and most specifically about 10 microns to about 175 microns.

In an embodiment, the particles of L-glufosinate ammonium salt prepared according to the present disclosure have a D50 (the median for a volume distribution, has been defined as the diameter where half of the population lies below this value) less than or equal to about 250 microns.

In an embodiment the present disclosure provides a process for preparing crystalline form I of L-glufosinate ammonium salt characterised by data selected from one or more of the following:

an X-ray powder diffractogram using Cu—Kα radiation displays at least three of the following reflections, quoted as 2θ(±0.2°) values of about 9.0, 11.6, 13.1, 14.1, 17.6, 18.2, 18.9, 19.5, 22.4, 23.4, 26.0, 31.1, 33.3 and 36.3;

L-glufosinate ammonium salt containing L-glufosinate and ammonium in a ratio in the range of 9.5-11:1;

a Differential Scanning Calorimetry (DSC) thermogram with at least two characteristic thermal events in the range of 65-115° C., 185-210° C. and 210-235° C.;

said process comprising:
a) suspending L-glufosinate hydrochloride salt in an alcohol solvent to form a suspension;
b) contacting the suspension with gaseous ammonia in nonaqueous conditions until complete dissolution of L-glufosinate hydrochloride salt to form a solution; and
c) subjecting the solution to conditions sufficient to precipitate crystalline form I of L-glufosinate ammonium salt.

The present disclosure also provides use of crystalline form of L-glufosinate ammonium salt for preparing other forms of L-glufosinate or its salt.

The present disclosure also encompasses the uses of above described crystalline form of L-glufosinate ammonium salt of the present disclosure for the preparation of agrochemical compositions and/or formulations.

The present disclosure comprises processes for preparing the above mentioned agrochemical formulations of L-glufosinate ammonium salt comprising above described crystalline form of L-glufosinate ammonium salt and one or more agrochemically acceptable additives/excipients.

In an aspect, the present disclosure provides an agrochemical composition comprising crystalline form I of L-glufosinate ammonium salt.

Thus, in an embodiment the present disclosure provides a herbicide composition comprising:
i) a crystalline form I of L-glufosinate ammonium salt; and
ii) at least one agrochemically acceptable additives/excipients.

In an embodiment the compositions according to the present disclosure comprises crystalline form I of L-glufosinate ammonium salt in an amount from about 1% to about 99% by weight of the composition.

In an embodiment the compositions according to the present disclosure comprises crystalline form I of L-glufosinate ammonium salt having a volume average particle size distribution D50 less than or equal to about 250 microns, specifically about 1 micron to about 200 microns, and most specifically about 10 microns to about 175 microns.

In an embodiment the agrochemically acceptable excipient/additives can be selected from adjuvants or surfactants including but not limited to wetting agents, emulsifiers, dispersants, viscosity-modifying agents, antifoaming agents, antifreeze agents, pH adjusting agents, stabilizers, anticaking agents, biocides and the like. The L-glufosinate ammonium composition according to the present disclosure may comprise additives such as surfactants, solvent, fertilizer, pH modifiers, crystallization inhibitors, viscosity modifiers, suspending agents, spray droplet modifiers, pigments, antioxidants, foaming agents, light-blocking agents, compatibilizing agents, antifoam agents, sequestering agents, neutralizing agents, corrosion inhibitors, dyes, odorants, spreading agents, penetration aids, micronutrients, emollients, lubricants, sticking agents, dispersing agents, thickening agents, freezing point depressants, antimicrobial agents, and the like.

In an embodiment the compositions according to the present disclosure can be in the form of soluble liquid concentrates, emulsion concentrates, microemulsions, suspension concentrates, water-dispersible powders or granules.

In an embodiment the compositions according to the present disclosure can be in the form of water-dispersible powders or granules.

In an embodiment the compositions according to the present disclosure further comprises one or more other active ingredients.

In an embodiment the active ingredients that can be present in the compositions according to the present disclosure is selected from but not limited to herbicides, fungicides, insecticides, defoliants, desiccants and plant growth regulators.

In an embodiment the active ingredient that can be present in the compositions according to the present disclosure is an herbicide.

The actives may be a water soluble or water insoluble herbicide selected from: Diphenyl ether herbicides such as oxyfluorfen, acifluorfen and its salts, lactofen and its salts, fomesafen and its salts; Pyrimidinyloxybenzoic analogue herbicides such as pyrithiobac sodium, bispyribac sodium; Organophosphrous based herbicides such as glyphosate and its salts, bilanafos and its salts, bialaphos and its salts; Bipyridinium herbicides such as paraquat and diquat and salts thereof; aryloxyalkanoic acid herbicides such as 2, 4-D and its salts and esters, MCPA, MCPB and their salts; aryloxyphenoxypropionic herbicides such as haloxyfop, isomers and esters, clodinafop and its esters; Pyridine herbicides such as triclopyr, picloram, aminopyralid and salts thereof; Aromatic herbicides such as dicamba, 2,3,6-TBA, tricamba and their salts; Pyridinecarboxylic acid herbicides such as clopyralid; Imidazolinones selected from imazameth, imazamethabenz, imazamox, imazapic, imazapyr, imazaquin, imazethapyr; herbicides such as sulfonyl urea herbicides such as flazasulfuron, rimsulfuron, bensulfuron, ethoxysulfuron, mesosulfuron, oxasulfuron, pyrazosurfuron-ethyl and their salts; cyclohexanedione oxime herbicides such as clethodim and its salts, chloroacetamide herbicide such as metolachlor and its salts and isomers, phenyl phthalimide herbicides such as flumioxazin and its salts, mesotrione, dinitroaniline herbicides such as oryzalin, pendimethalin, profluralin, trifluralin and its salts, bicyclic dicarboxylic acid herbicides such as endothal and its salts or mixtures of such herbicides.

In an embodiment suitable herbicides may be selected from acetochlor, acifluorfen, aclonifen, alachlor, ametryn, amidosulfuron, aminopyralid, amitrole, anilofos, asulam, atrazine, azafenidin, azimsulfuron, benazolin, benfluralin, bensulfuron-methyl, bentazone, bifenox, binalafos, bispyribac-sodium, bromacil, bromoxynil, butachlor, butroxidim, cafenstrole, carbetamide, carfentrazone-ethyl, chloridazon, Chlorimuron-ethyl, chlorobromuron, chlorotoluron, chlorsulfuron, cinidon-ethyl, cinosulfuron, clethodim, Clomazone, Clopyralid, Cloransulam-methyl, Clorsulfuron, Cyanazine, Cycloate, Cyclosulfamuron, Cycloxydim, Dalapon, Desmedipham, Dicamba, Dichlobenil, Dichlormid, Diclosulam, Diflufenican, Dimefuron, Dimepipeate, Dimethachlor, Dimethenamid, Diquat, Diuron, Esprocarb, Ethalfluralin, Ethametsulfuron-methyl, Ethofumesate, Ethoxysulfuron, Fentrazamide, Flazasulfuron, Florasulam, Fluchloralin, Flufenacet, Flumetsulam, Flumioxazin, Fluometuron, Flupyrsulfuron-methyl, Fluorochloridone, Fluoroxypyr, Flurtamone, Fomesafen, Foramsulfuron, Hexazinone, Imazamethabenz-m, Imazamox, mazapic, Imazapyr, Imazaquin, Imazethapyr, Imazosulfuron, Iodosulfuron, Ioxynil, Isoproturon, Isoxaben, Isoxaflutole, Lactofen, Lenacil, Linuron, Mefenacet, Mesosulfuron-Methyl, Mesotrione, tembotrione, topramezone, Metamitron, Metazachlor, Methabenzthiazuron, Metobromuron, Metolachlor, S-metolachlor Metosulam, Metoxuron, Metribuzin, Metsulfuron-methyl, Molinate, MSMA, Napropamide, Nicosulfuron, Norflurazon, Oryzalin, Oxadiargyl, Oxadiazon, Oxasulfuron, Oxyfluorfen, Paraquat, Pendimethalin, Phenmedipham, Picloram, Pretilachlor, Profoxydim, Prometryn, Propanil, Propisochlor, Propoxycarbazone, Propyzamide, Prosulfocarb, Prosulfuron, Pyraflufen-ethyl, Pyrazosulfuron, Pyroxasulfone, Pyridate, Pyrithiobac, Quinclorac, Quinmerac, Quinotrione, Rimsulfuron, Sethoxydim, Simazine, Sulcotrione, Sulfentrazone, Sulfosulfuron, Tebuthiuron, Tepraloxydim, Terbuthylazine, Terbutryn, Thifensulfuron-methyl, Thiobencarb, Tralkoxydim, Triallate, Triasulfuron, Tribenuron-methyl, Triclopyr, Trifloxysulfuron, Trifluralin, Triflusulfuron-methyl, Tritosulfuron, and mixtures and combinations thereof.

In an embodiment the compositions of the present disclosure can be used on tolerant crops which are tolerant to glufosinate.

The herbicidal compositions of the present disclosure can, further, be used in conjunction with glyphosate, dicamba, or 2,4-D on glyphosate-tolerant, dicamba-tolerant, or 2,4-D-tolerant crops.

In an embodiment the compositions according to the present disclosure can be used in combination with herbicides that are selective for the crop being treated and which complement the spectrum of weeds controlled by these compositions at the application rate employed. When used in conjunction with the other active ingredients, the presently claimed L-glufosinate ammonium salt can be formulated with the other active ingredients as premix concentrates, tank mixed with the other active ingredients for spray application or applied sequentially with the other active ingredients in separate spray applications. The compositions may be diluted from 1 to 2000 fold in a pesticide spray mixture at the point of use depending on the local agricultural practices and used in pesticide spray applications to control weeds in crop and non-crop environments.

In an embodiment the disclosure provides a method for the control of undesired plant growth, comprising subjecting the plants or their locus to the action of a composition comprising:
   i) a crystalline form I of L-glufosinate ammonium salt; and
   ii) one or more agrochemically acceptable additives.

In an aspect the present disclosure provides a method for the control of undesired plant growth, comprising subjecting the plants or their locus to the action of a crystalline form I of L-glufosinate ammonium salt.

In an embodiment the present disclosure provides a method for the control of undesired plant growth, comprising subjecting the plants or their locus to the action of agronomically effective amount of a crystalline form I of L-glufosinate ammonium salt.

In an embodiment the agronomically effective amount comprises from about 10 grams of a crystalline form I of L-glufosinate ammonium salt per hectare to about 1500 grams of a crystalline form I of L-glufosinate ammonium salt per hectare.

In an embodiment the agronomically effective amount comprises from about 100 grams of a crystalline form I of L-glufosinate ammonium salt per hectare to about 1000 grams of a crystalline form I of L-glufosinate ammonium salt per hectare.

In an embodiment the temperature range during the application period of the compositions according to the present invention may be critical and would vary based on the crops and geographical region.

ANALYTICAL METHODS

Powder X-Ray Diffraction (XRD) Method:
   X-ray powder diffractogram crystalline form I of L-glufosinate ammonium salt recorded using Cu—Kα radiation. The detailed parameters are given below
   Instrument: Bruker make $2^{nd}$ generation D2 Phaser Powder X-Ray diffractometer;
   Operated at: 30.0 kV, 10 mA;
   Radiation: Cu Kα;
   Mode: Reflection
   Wavelength: 1.54060° A,
   Scan Range: 2-40 2θ,
   Step size: 0.02°
Differential Scanning Calorimeter (DSC):
   Differential Scanning Calorimetry thermogram for crystalline form I of L-glufosinate ammonium salt were recorded as follows:
   Instrument: Differential Scanning Calorimeter Mettler Toledo DSC-3
   Heating rate: 10° C./min
   Temperature range: 30° C. to 350° C., under N2 flow of 20 ml/min
Particle Size:
   Particle size distribution of L-glufosinate ammonium salt was recorded using Malvern Mastersizer 2000 Particle Size Analyzer with Hydro 2000SM (A) accessory using 1% suspension of L-glufosinate ammonium salt in dry isopropyl alcohol.

The instant invention is more specifically explained by below examples. However, it should be understood that the scope of the present invention is not limited by the examples in any manner. In some instances, some features of the disclosed embodiments may be employed without a corresponding use of the other features. Accordingly, it is appropriate that the claims be construed broadly and in a manner consistent with the scope of the invention. It will be appreciated by any person skilled in this art that the present invention includes below examples and further can be modified and altered within the technical scope of the present invention.

EXAMPLES

Preparation of Crystalline Form of L-Glufosinate Ammonium Salt

Example 1: Preparation of L-Glufosinate Ammonium Salt 366 g (1.35 mole) of L-glufosinate hydrochloride salt was suspended in 2820 g of methanol (1:7.7 w/w) at 30° C. The suspension was purged with dry ammonia gas (57.1 g, 3.36 moles) until the pH of the solution reaches between 7.9-8.5 and complete dissolution of L-glufosinate hydrochloride salt. The reaction mass was then heated to and maintained at 65-70° C. until L-glufosinate ammonium salt started precipitating out (4-6 hours). The reaction mass was then cooled to 30° C. and left for 1-2 hours for complete precipitation of the product. The precipitated L-glufosinate ammonium salt was filtered and washed with 300 g of methanol to give 225 g of the L-glufosinate ammonium salt. Yield 78.4%; Purity by HPLC 96.63%; L-glufosinate: 0.25%; L-glufosinate hydrochloride salt<0.05%, FIGS. 1 and 2. L-glufosinate to ammonium ratio (w/w)–9.88:1.

Figure 3:
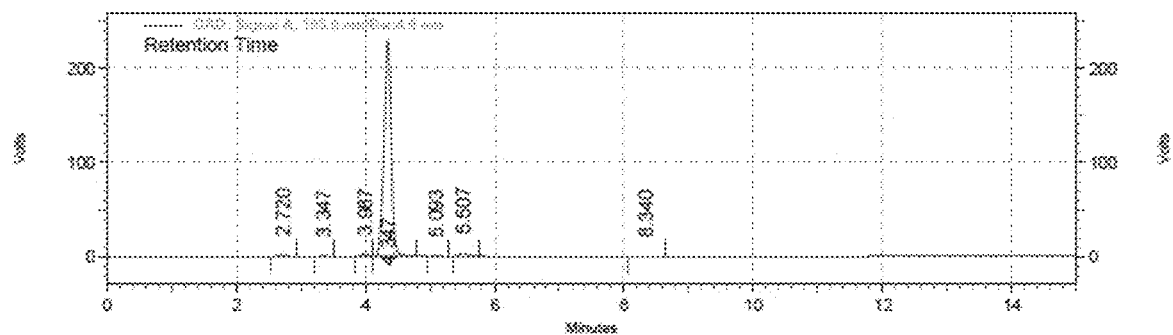
FIG. 3: HPLC chromatogram of L-glufosinate ammonium salt prepared according to the present disclosure.

Example 2: Preparation of L-Glufosinate Ammonium Salt 530 g (1.95 mole) of L-glufosinate hydrochloride salt was suspended in 3700 g of methanol (1:7.0 w/w) at 30° C. The suspension was purged with dry ammonia gas (83 g, 4.87 moles) till complete dissolution of L-glufosinate hydrochloride salt. The reaction mass was then heated to and maintained at 65-70° C. until L-glufosinate ammonium salt started precipitating out (4-6 hours). The reaction mass was then cooled to 30° C. and left for 1-2 hours for complete precipitation of the product. The precipitated L-glufosinate ammonium salt was filtered and washed with 400 g of methanol to give 342 g of the L-glufosinate ammonium salt. Yield 85%; Purity by HPLC 96.47%, FIG. 3; L-glufosinate: 0.19%; L-glufosinate hydrochloride salt<0.05%. L-glufosinate to ammonium ratio –9.79:1.

The sample was tested again after a period of 360 days and L-glufosinate to ammonium ratio (w/w) was found to be –9.82:1.

Figure 4:
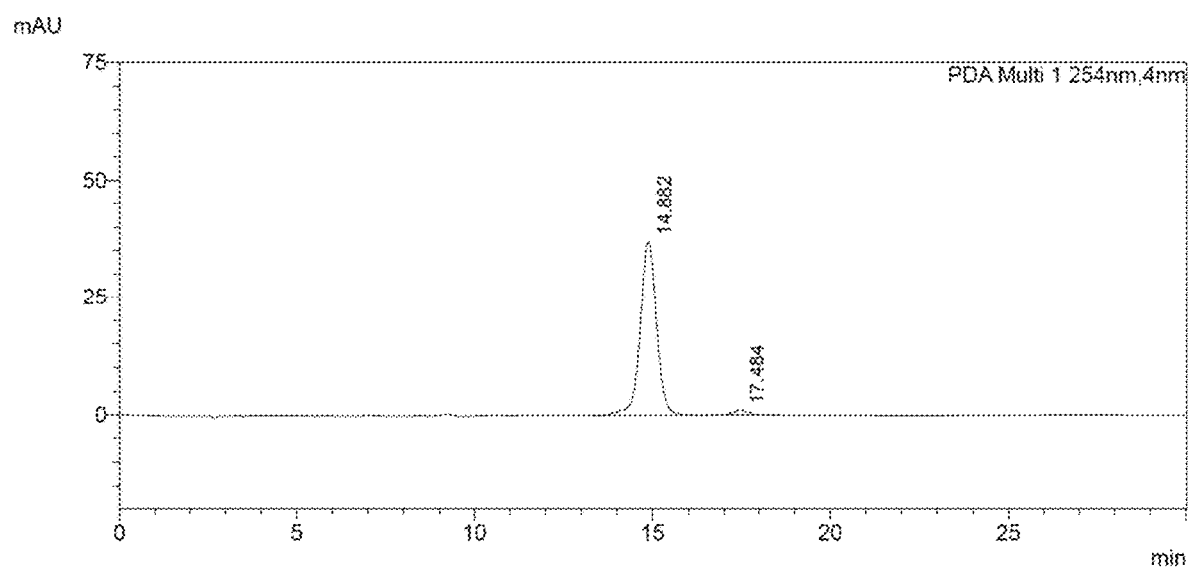
FIG. 4: Chiral HPLC chromatogram of L-glufosinate ammonium salt prepared according to the present disclosure.
Figure 5:
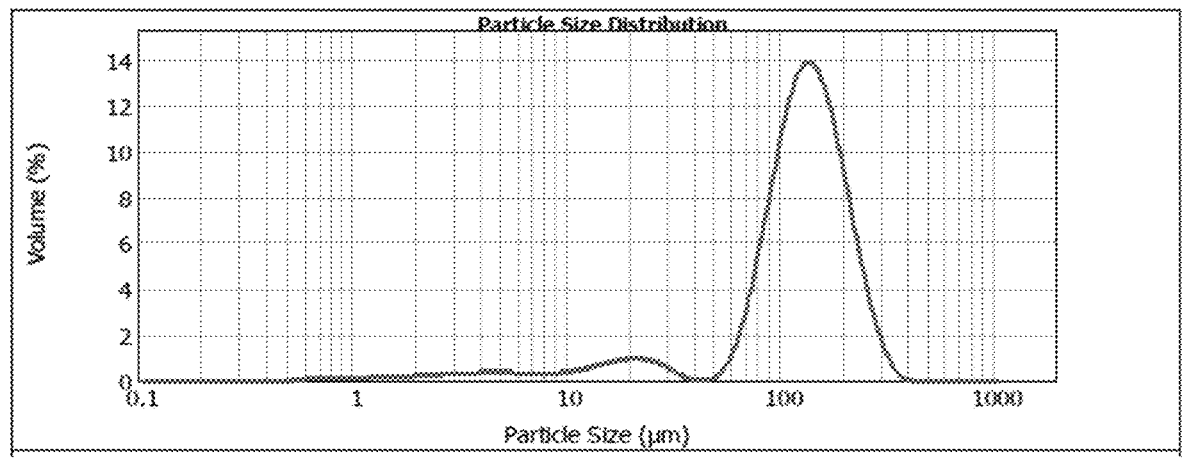
FIG. 5: Particle size distribution of L-glufosinate ammonium salt.

Example 3: Preparation of L-Glufosinate Ammonium Salt 70 g (0.283 mole) of L-glufosinate hydrochloride salt was suspended in 490 g of methanol (1:7.0 w/w) at 30° C. The suspension was purged with dry ammonia gas (12 g, 0.70 moles) until complete dissolution of L-glufosinate hydrochloride salt. The reaction mass was heated to and maintained at 70-75° C. until L-glufosinate ammonium salt started precipitating out (4-6 hours). The reaction mass was then cooled to 30° C. and left for 1-2 hours for complete precipitation of the product. The precipitated L-glufosinate ammonium salt was filtered and washed with 50 g of methanol to give 45 g of the L-glufosinate ammonium salt. Yield: 80%; Purity by HPLC: 98.13%; Chiral purity: 97.05: 2.95; FIG. 4.

Example 4: Preparation of L-Glufosinate Ammonium Salt (Ratio of L-Glufosinate Hydrochloride Salt to Alcohol is 1:6)

70 g (0.283 mole) of L-glufosinate hydrochloride salt was suspended in 420 g of methanol (1:6.0 w/w) at 30° C. The suspension was purged with dry ammonia gas (12 g, 0.70 moles) until the pH of the solution reaches between 7.9-8.5 and complete dissolution of L-glufosinate hydrochloride salt. The reaction mass was then heated to and maintained at 65-70° C. until L-glufosinate ammonium salt started precipitating out (4-6 hours). The reaction mass was then cooled to 30° C. and left for 1-2 hours for complete precipitation of the product. The precipitated L-glufosinate ammonium salt was filtered and washed with 42 g of methanol to give 48 g of the L-glufosinate ammonium salt. Yield: 82.7%; Purity by HPLC: 96.5%.

Example 5: Preparation of L-Glufosinate Ammonium Salt (Ratio of L-Glufosinate Hydrochloride Salt to Alcohol is 1:10)

70 g (0.283 mole) of L-glufosinate Hydrochloride salt was suspended in 700 g of methanol (1:10.0 w/w) at 30° C. The suspension was purged with dry ammonia gas (12 g, 0.70 moles) until the pH of the solution reaches between 7.9-8.5 and complete dissolution of L-glufosinate hydrochloride salt. The reaction mass was then heated to and maintained at 65-70° C. until L-glufosinate ammonium salt started precipitating out (4-6 hours). The reaction mass was then cooled to 30° C. and left for 1-2 hours for complete precipitation of the product. The precipitated L-glufosinate ammonium salt was filtered and washed with 70 g of methanol to give 40 g of the L-Glufosinate ammonium salt. Yield: 70.6%; Purity by HPLC: 98.9%.

Example 6: Preparation of L-Glufosinate Ammonium Salt 350 g (1.29 mole) of L-glufosinate hydrochloride salt was suspended in 2700 g of methanol (1:7.7 w/w) at 30° C. The suspension was purged with dry ammonia gas (54.6 g, 3.19 moles) until the pH of the solution reaches between 7.9-8.5 and complete dissolution of L-glufosinate hydrochloride salt. The reaction mass was then heated to and maintained at 65-70° C. until L-glufosinate ammonium salt started precipitating out (4-6 hours). The reaction mass was then cooled to 30° C. and left for 1-2 hours for complete precipitation of the product. The precipitated L-glufosinate ammonium salt was filtered and washed with 290 g of methanol to give 209 g of the L-glufosinate ammonium salt. Yield 80%; Purity by HPLC 97.4%; L-glufosinate: 0.1%; L-glufosinate hydrochloride salt<0.05%, FIG. 2. L-glufosinate to ammonium ratio (w/w)–9.90:1.

Example 7: Preparation of L-Glufosinate Ammonium Salt 350 g (1.29 mole) of L-glufosinate hydrochloride salt was suspended in 2450 g of methanol (1:7 w/w) at 30° C. The suspension was purged with dry ammonia gas (68 g, 2.5 equ.) until the pH of the solution reaches between 7.9-8.5 and complete dissolution of L-glufosinate hydrochloride salt. The reaction mass was then heated to and maintained at 65-70° C. until L-glufosinate ammonium salt started precipitating out (4-6 hours). The reaction mass was then cooled to 30° C. and left for 1-2 hours for complete precipitation of the product. The precipitated L-glufosinate ammonium salt was filtered and washed with 290 g of methanol to give 262 g of the L-glufosinate ammonium salt. Yield 92.5%; Chiral ratio 98.7:1.3; L-glufosinate to ammonium ratio (w/w/)–9.60:1.

The sample was tested after a period of 50 days and L-glufosinate to ammonium ratio (w/w) was found to be 9.61:1.

Formulations

Example 8: A Soluble Liquid Concentrate Formulation Comprising Crystalline Form I of L-Glufosinate Ammonium Salt Prepared According to the Present Disclosure is Given Below

| Ingredients | Quantity (% w/w) |
| --- | --- |
| L-Glufosinate ammonium salt | 13.5 |
| Alkyl glucamide | 5 |
| Sodium lauryl ether sulfate | 20 |
| Glycol ether (solvent) | 3 |
| Potassium chloride | 5 |
| Water | Q.S |
| Total | 100 |

Example 9: A Water Dispersible Granular Formulation Comprising Crystalline Form I of L-Glufosinate Ammonium Salt is Given Below

| Ingredients | Quantity (% w/w) |
| --- | --- |
| L-Glufosinate ammonium salt | 50 |
| Alcohol ethoxylate | 7 |
| Methyl palmitate/oleate | 7 |
| Polyvinylpyrrolidone | 0.5 |
| Potassium chloride | 3 |
| Sodium alkyl sulfate | 6 |
| Hexamethylenetetramine | 5 |
| Ammonium sulfate | Q.S |
| Total | 100 |

Example 10: A Water Dispersible Granular Formulation Comprising Crystalline Form I of L-Glufosinate Ammonium Salt is Given Below

| Ingredients | Quantity (% w/w) |
| --- | --- |
| L-Glufosinate ammonium salt | 50 |
| Alcohol ethoxylate | 6 |
| Methyl palmitate/oleate | 2.5 |
| Potassium chloride | 5 |
| Sodium alkyl sulfate | 8 |
| Hexamethylenetetramine | 1 |
| Ammonium sulfate | Q.S |
| Total | 100 |

Example 11: A Water Dispersible Granular Formulation Comprising Crystalline Form I of L-Glufosinate Ammonium Salt is Given Below

| Ingredients | Quantity (% w/w) |
| --- | --- |
| L-Glufosinate ammonium salt | 26 |
| methyl palmitate/oleate methyl ester blend | 2.5 |
| silica | 3 |
| Hexamethylenetetramine | 1 |
| Alcohol ethoxylate | 6 |
| Sodium alkyl sulfate | 8 |
| Potassium chloride | 5 |
| Ammonium sulfate | 48 |
| Polydimetyl siloxane | 0.5 |

Example 12: A Water Dispersible Granular Formulation Comprising Crystalline Form I of L-Glufosinate Ammonium Salt is Given Below

| Ingredients | Quantity (% w/w) |
| --- | --- |
| L-Glufosinate ammonium salt | 26 |
| methyl palmitate/oleate methyl ester blend | 2.5 |
| Magnesium chloride | 20 |
| silica | 3 |
| Hexamethylenetetramine | 1 |
| Alcohol ethoxylate | 6 |
| Sodium alkyl sulfate | 8 |
| Potassium chloride | 5 |
| Polydimethyl siloxane | 0.5 |
| Ammonium sulfate | 28 |
| Total | 100 |

Example 13: A Water Dispersible Granular Formulation Comprising Crystalline Form I of L-Glufosinate Ammonium Salt is Given Below

| Ingredients | Quantity (% w/w) |
| --- | --- |
| L Glufosinate ammonium salt | 26 |
| Magnesium Chloride | 20 |
| Silica | 3 |
| Hexamethylenetetramine | 1 |
| Phosphate ester | 8 |
| Sodium alkyl sulfate | 8 |
| Potassium chloride | 5 |
| Polydimethyl siloxane | 0.5 |
| Ammonium sulfate | 28.5 |

Example 14: A Water Dispersible Granular Formulation Comprising Racemic Glufosinate Ammonium Salt is Given Below (Comparative Example)

| Ingredients | Quantity (% w/w) |
| --- | --- |
| Glufosinate ammonium salt | 52.1 |
| methyl palmitate/oleate | 2.5 |
| Silica | 3 |
| Hexamethylenetetramine | 1 |
| Alcohol ethoxylate | 6 |
| Sodium alkyl sulfate | 8 |
| Potassium chloride | 5 |
| Polydimethyl siloxane | 0.5 |
| Ammonium sulfate | 21.9 |

Example 15: A Water Dispersible Granular Formulation Comprising Racemic Glufosinate Ammonium Salt is Given Below (Comparative Example)

| Ingredients | Quantity (% w/w) |
| --- | --- |
| Glufosinate ammonium salt | 52.1 |
| Silica | 3 |
| Magnesium Chloride | 20 |
| Hexamethylenetetramine | 1 |
| Phosphate ester | 8 |
| Sodium alkyl sulfate | 8 |
| Potassium chloride | 5 |
| Polydimethyl siloxane | 0.5 |
| Ammonium sulfate | 2.4 |

Field Trial Efficacy Data:

Field trials were carried out using water dispersible granular formulation comprising crystalline form I of L-glufosinate ammonium salt prepared according to the present disclosure as the broad spectrum herbicide.

The compositions were dispersed with water and optionally with other tank mix auxiliaries and applied at a water application rate of 300-600 l/ha to crop and non-crop land containing many broad leave weeds, grasses and sedges.

Inventors of the present disclosure carried out field trials using samples prepared according to Examples 11 (Sample 1), Example 12 (Sample 2) and Example 13 (Sample 3) at a dose of 250 g a.i per hectare. After treatment using said compositions, chlorosis followed by necrosis of the weeds were observed demonstrating the bio-efficacy of the new formulations. The observations at 4 days and 14 days after application were summarized in below tables. Comparative samples were prepared according Example 14 (Sample 4) and Example 15 (Sample 5) and trials were conducted at a dose of 500 g a.i/ha. The details of the trials are presented below.

TABLE 1

| | |
| --- | --- |
| Crop: | Grapes |
| Target weeds: | Amaranthus Viridis, Parthenium hysterophorus, Euphorbia Hirta, Euphorbia Hyperceifolia and Echinocloa Colonum |
| Water Volume: | 600 l/ha |
| Nozzle: | Flat Fan Nozzle |

TABLE 2

% weed control at 4 days after application

| Sample | Amaranthus viridis | Parthenium hysterophorus | Euphorbia hirta | Euphorbia hyperceifolia | Echinocloa colonum |
| --- | --- | --- | --- | --- | --- |
| Sample 1 | 42.5 | 42.5 | 32.5 | 30.0 | 25.0 |
| Sample 2 | 40.0 | 42.5 | 27.5 | 27.5 | — |
| Sample 3 | 40.0 | 42.5 | 27.5 | 27.5 | 30.0 |
| Sample 4 | 40.0 | 35.0 | 30.0 | 25.0 | 25.0 |
| Sample 5 | 40.0 | 40.0 | 30.0 | 30.0 | 25.0 |

TABLE 3

% weed control at 14 days after application

| Treatments | Amaranthus viridis | Parthenium hysterophorus | Euphorbia hirta | Euphorbia hyperceifolia | Echinocloa |
| --- | --- | --- | --- | --- | --- |
| Sample 1 | 72.5 | 72.5 | 50.0 | 47.5 | 40.0 |
| Sample 2 | 67.5 | 70.0 | 50.0 | 47.5 | — |
| Sample 3 | 65.0 | 72.5 | 47.5 | 47.5 | 40.0 |
| Sample 4 | 65.0 | 72.5 | 47.5 | 45.0 | 40.0 |
| Sample 5 | 67.5 | 70.0 | 47.5 | 47.5 | 40.0 |

It has been evident from the above table the compositions according to the present disclosure exhibited acceptable weed control against various persistent weeds. It has been further noted that performance of the inventive compositions at half dosage are at least equal and, in many cases, surpasses the weed control measures compared to racemic glufosinate ammonium compositions. Thus, it has been established that the inventive compositions are highly efficacious and eliminates employing inactive D isomer of glufosinate thereby making such compositions environmentally friendly and easily biodegradable.

The invention claimed is:

1. A process for producing a compound of Formula (I)

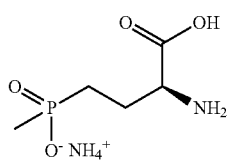

Formula (I)

said process comprising:
a) suspending an acid addition salt compound of Formula (II), wherein A– is an anion, in an alcohol solvent to form a suspension;

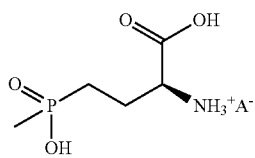

Formula (II)

b) contacting the suspension with gaseous ammonia until complete dissolution of the compound of Formula (II) to form a solution; and
c) subjecting the solution to conditions to precipitate the compound of Formula (I).

2. The process according to claim 1, the process comprising:
a) contacting a suspension comprising an acid addition salt compound of Formula (II), wherein A– is an anion, in an alcohol solvent with gaseous ammonia under nonaqueous conditions to form a solution; and
b) subjecting the solution to conditions to precipitate the compound of Formula (I).

3. The process for producing the compound of Formula (I) according to claim 1, wherein a ratio of the compound of Formula (II) to the alcohol is from about 1:5 to about 1:15 by weight.

4. The process for producing the compound of Formula (I) according to claim 1, wherein said alcohol solvent is methanol, ethanol, propyl alcohol, isopropyl alcohol, glycol, glycerol, or a mixture thereof.

5. The process for producing the compound of Formula (I) according to claim 1, wherein a ratio of the acid addition salt compound of Formula (II) to the alcohol is from about 1:5 to about 1:10 by weight.

6. The process for producing the compound of Formula (I) according to claim 1, wherein a ratio of the acid addition salt compound of Formula (II) to the gaseous ammonia is from about 1:1 to about 1:5.

7. The process for producing a compound of Formula (I) according to claim 1, wherein said compound is a crystalline form of L-glufosinate ammonium salt.

8. A method of using a crystalline form of L-glufosinate ammonium salt according to claim 7 for preparing other forms of L-glufosinate or salts thereof.

9. A method of using a crystalline form of L-glufosinate ammonium salt according to claim 7 for the preparation of agrochemical compositions and/or formulations.

* * * * *